June 27, 1961 F. SCHEFMAN 2,989,861
KEY HOLDER AND EJECTOR
Filed April 4, 1960
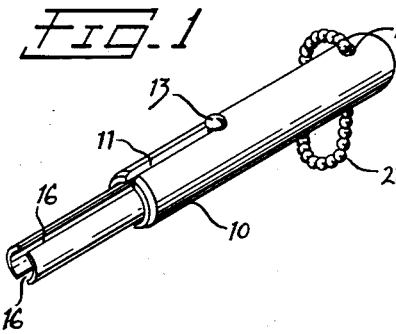
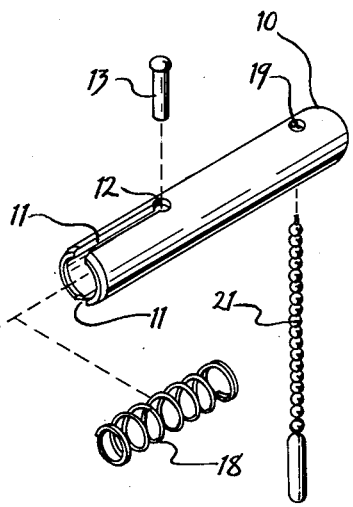
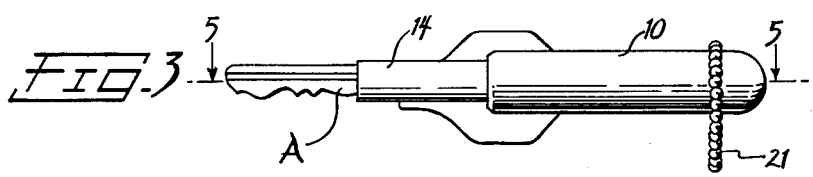
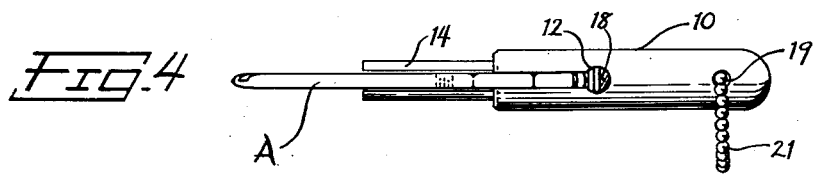
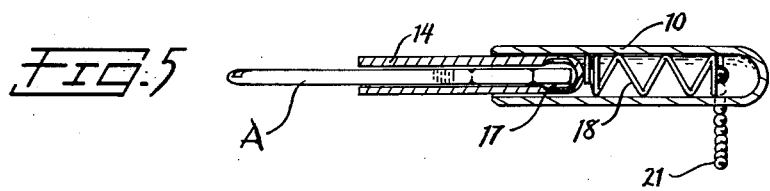
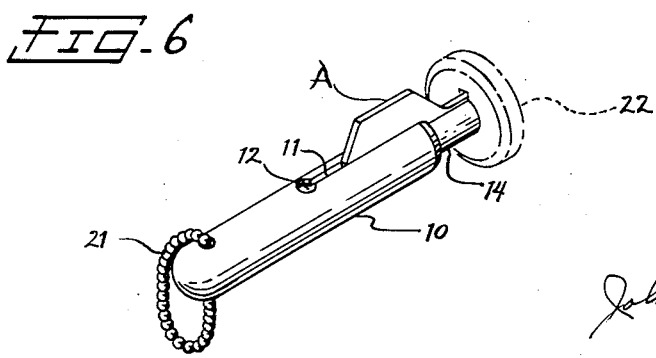
INVENTOR.
FRED SCHEFMAN
BY
*John J. McLoughlin*
ATTORNEY United States Patent Office  
2,989,861  
Patented June 27, 1961

2,989,861  
KEY HOLDER AND EJECTOR  
Fred Schefman, Phoenix, Ariz., assignor to Lee-Ray Industries, Phoenix, Ariz., a corporation of Arizona  
Filed Apr. 4, 1960, Ser. No. 19,626  
2 Claims. (Cl. 70—414)

My invention relates to an improved, simplified and dependable ignition key holder and ejector.

I am aware that many patents have been issued and devices produced having for their purpose forcing an automobile driver to remove the ignition key from the lock when the ignition is turned off. I am aware, also, that many of the expedients suggested include relatively slidable parts with either a tension or compression spring so constructed and arranged that one slidable part is presumably effective to hold or house the key and the other slidable part is intended to produce an ejecting action. Notwithstanding suggestions made, a completely fool-proof, inexpensive ignition key holder and ejector has not been made available. One of the principal difficulties is the relatively great cost as contrasted with other available forms of key holders for ignition keys. Some of the prior art devices have failed because they did not function and many of them have as a part of their structure mechanism to render the ejection feature inoperative, thus defeating the very purpose of the device itself.

The principal object of my present invention is the provision of an improved ignition key holder and ejector.

Another object of my invention is the provision of a device of the type identified which is relatively inexpensive.

A still further object is the provision of an ignition key holder and ejector in which the ordinary unskilled person can very quickly and expeditiously insert a key without the use of special tools.

A further object is the provision of an improved ignition key holder and ejector which, with the key, forms a very compact, easily located and easily utilized package.

A still further object is the provision of an improved ignition key holder and ejector so constructed and arranged that even the most careless, forgetful person cannot impair its operation or disregard the ejecting action which occurs when the ignition key is turned to the off position.

Other specific objects and features of my invention will be made apparent from the following detailed description taken with the accompanying drawings, wherein;

FIG. 1 is an isometric view showing the device as it is vended with the pin retaining the sliding member in position;

FIG. 2 is an exploded view showing all of the parts making up the device;

FIG. 3 is a side elevational view showing a key held by the holder and in a position for ejection action when the key is used;

FIG. 4 is a planned view showing the manner in which the key head is held in the slots of the outer tube, and the key head and shank are slidable in the slots formed by the bifurcations of the inner sliding member;

FIG. 5 is a sectional view taken on the line 5—5 of FIG. 3;

FIG. 6 is an isometric view showing the manner in which the inner sliding member engages the face of the lock in position to produce the ejecting function.

Referring now to the drawings, the embodiment of the invention shown comprises an outer tubular member 10 closed at one end and having a pair of parallel, oppositely positioned, relatively short end slots 11. The slots 11 have inner slightly enlarged, rounded portions 12 for the receipt of a temporary retaining pin 13. A generally tubular sliding member 14, having a key ejecting function as will be described, has its exterior surface in relatively snug but not binding engagement within the inner tubular surface of the tubular member 10. The tubular sliding member 14 is in slidable relation within the outer tubular member 10, and has a closed end within the outer tubular member and an open end projecting therefrom. The projecting open end of the tubular sliding member 14 has oppositely positioned slots 16 forming a bifurcation the two arms of which are of arcuate cross-section. The inner ends of the slots 16 are provided with enlarged portions 17, the inner end of the sliding member 14 near the enlarged portions 17 being closed. A coil spring 18 within the outer tube 10 is compressed between the inner closed end of the outer tube 10 and the outer closed end of the sliding member 14. The outer tubular member 10 may be pierced to form a pair of holes 19 for a chain 21. When the chain 21 is used the spring may merely engage against the portion of the chain within the tube. When the chain 21 is not employed the end of the spring 18 can merely engage the material of the tube itself. The point of engagement with the spring, the parts being properly dimensioned, in other words is not critical. As vended, the holder and ejector of my present invention has the appearance shown in FIG. 1. When so assembled the pin 13 extends through the rounded enlarged portions 12 of the outer tube 10 and 17 of the sliding member 14.

When the device is to be used with an ignition key, all that is necessary is to force the head of the key A into the slot 11 as clearly shown in FIGS. 3 through 6 inclusive. Since ignition keys almost all employ the same type of blanks, or at least blanks having approximately the same head thickness, the width of the slots 11 may be so controlled in the manufacture that firm frictional engagement between the head of the key and the sides of the slots 11 will retain the key in firm engagement but will still permit the key's withdrawal if desired. When the key has been inserted, all that is necessary is to apply a little pressure to slightly compress the spring 18 and allow the pin 13 to drop out. The head of the key A now acts as a stop. This is accomplished because all portions of the key fit loosely within the slots 16 and since the spring 18 is engaged against the outer closed end of the slide 14, the inner closed end of the slide 14 at the inner end of the enlarged portion 17 of the slot 16 engages the contiguous portion of the key head.

When the key has been inserted, the holder and ejector plus the key itself form a package as shown particularly in FIGS. 3 and 4 which is light in weight and very convenient to hold in the hands and fingers. The key is inserted into a lock indicated by dotted lines 22 in FIG. 6. As the key is inserted, the outer ends of the sliding member 14 engage against the face of the lock and as the key is inserted spring 18 is compressed. The turning of the key in the lock effectively prevents withdrawal of the key and in this manner effectively prevents ejection of the key from the lock due to the compression of spring 18. Thus the key functions in the ordinary way and the user pays no attention to the key holder or ejector while he is driving; and it is absolutely unnecessary for him at any time to make any adjustments such as has been necessary with some prior art devices. When the driver reaches the end of his trip, however, and turns the ignition key to off position, the key is in a position to be withdrawn by hand. It is also in a position to be ejected by the force of the spring 18 pushing the sliding member 14 outward with its ends against the lock, thereby positively and forcefully withdrawing the key. The action is so definite that even the careless user is aware of the action and will automatically take the key in his hand and return it to his pocket. He cannot leave the key in the lock.

The device of my present invention is very inexpensively produced while still presenting a desirable, salable appearance. The outer tube 10, for example, may be produced of aluminum inexpensively by standard machine tool practices. It may then be anodized to produce a very finished appearance. The sliding member 14 is suitably formed of aluminum strip illustratively about $\frac{1}{32}$ inch thick and about $\frac{5}{32}$ inch wide. In the forming operation it is brought to a generally tubular shape with rounded outer surfaces for smooth but easy engagement against the inner rounded surface of the outer tube 10. This provides the necessary bifurcation with the slots 16 between the two arms of the bifurcation and a closed end against which the head of the key engages when the device is finally assembled in the intended manner. The sliding member 14 may also be finished if desired, but because of its contact with the key and its sliding action, I found that it has a good appearance and operates well if the surface of the aluminum used for its manufacture is entirely untreated.

While the specific relationship of parts is essential to a satisfactory operation of the device of the present invention, minor modifications in structure may be made in the practice of the invention within the scope of the appended claims.

I claim:

1. In a key holder and ejector, an outer tubular member with one closed end and one open end, and having parallel, oppositely positioned, relatively short slots on its open end for frictionally engaging a key head, an inner tubular sliding member with a closed end extending within the outer tubular member and an open end slotted to form a bifurcation, the arms of which are adapted to lie on opposite sides of a key shank, and a compression spring within the outer tubular member and engaging the closed end of the tubular sliding member, insertion into a lock of a key held in the slots in the outer tubular member causing the outer end of said tubular sliding member to engage the lock and causing the sliding member to be pushed back as the key is inserted, whereby the spring is held in compressed relation when the key is turned in the lock, and whereby the spring is expanded and automatically functions to withdraw the key from the lock by force of spring pressure of the open end of the tubular sliding member against the lock as an incident of the key being turned to insertable and ejectable position.

2. A key holder as defined in claim 1 including an anchoring pin extending through the outer tube and slots in the tubular sliding member to prevent ejection of the tubular sliding member by the compression spring when the head of a key is not engaged within the end slots of the outer tube.

References Cited in the file of this patent

UNITED STATES PATENTS

| | | |
|---|---|---|
| 2,484,547 | Bishop | Oct. 11, 1949 |
| 2,625,814 | Mullan | Jan. 20, 1953 |
| 2,738,667 | Thompson | Mar. 20, 1956 |